US011175397B2

United States Patent
Lu et al.

(10) Patent No.: US 11,175,397 B2
(45) Date of Patent: Nov. 16, 2021

(54) WIRELESS FIDELITY WI-FI RANGING METHOD AND SYSTEM, AND RELATED DEVICE

(71) Applicant: HUAWEI TECHNOLOGIES CO., LTD., Guangdong (CN)

(72) Inventors: Henghui Lu, Beijing (CN); Zhiming Ding, Shenzhen (CN); Zhenguo Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 16/085,069

(22) PCT Filed: Mar. 15, 2017

(86) PCT No.: PCT/CN2017/076818
§ 371 (c)(1),
(2) Date: Sep. 14, 2018

(87) PCT Pub. No.: WO2017/157306
PCT Pub. Date: Sep. 21, 2017

(65) Prior Publication Data
US 2019/0086533 A1 Mar. 21, 2019

(30) Foreign Application Priority Data
Mar. 16, 2016 (CN) .......................... 201610149119.4

(51) Int. Cl.
*G01S 13/76* (2006.01)
*H04W 64/00* (2009.01)
(Continued)

(52) U.S. Cl.
CPC ............ *G01S 13/765* (2013.01); *G01S 7/295* (2013.01); *G01S 11/00* (2013.01); *H04W 24/08* (2013.01); *H04W 64/003* (2013.01); *H04W 84/12* (2013.01)

(58) Field of Classification Search
CPC ........ G01S 13/765; G01S 7/295; G01S 11/00; H04W 24/08; H04W 64/003; H04W 84/12
See application file for complete search history.

(56) References Cited

U.S. PATENT DOCUMENTS 9,137,681 B2    9/2015 Mohan et al.
10,142,862 B2 * 11/2018 Ben-Haim .............. H04L 43/08
(Continued)

FOREIGN PATENT DOCUMENTS

CN    104284351 A    1/2015
CN    105101405 A    11/2015
(Continued)

OTHER PUBLICATIONS

IEEE 802.11-15/0030r9 Jonathan Segev et al., "802.11 NGP SG Proposed PAR",dated Jul. 14, 2015, IEEE P802.11 Wireless LANs,total 6 pages.
(Continued)

*Primary Examiner* — Jeffrey M Rutkowski
*Assistant Examiner* — Jasper Kwoh
(74) *Attorney, Agent, or Firm* — Fish & Richardson P.C.

(57) ABSTRACT

Embodiments of the present invention disclose a Wi-Fi ranging method including: receiving, by a target node, a first NDP sent by a reference node and recording a first NDP receiving time of receiving the first NDP, and sending a second NDP to the reference node and recording a second NDP sending time of sending the second NDP; receiving, by the target node, a ranging response frame sent by the
(Continued)

reference node, where the ranging response frame includes a first NDP sending time at which the reference node sends the first NDP and a second NDP receiving time at which the reference node receives the second NDP; and calculating, by the target node, a distance between the target node and the reference node based on the first NDP receiving time, the second NDP sending time, the first NDP sending time, and the second NDP receiving time.

8 Claims, 6 Drawing Sheets

(51) Int. Cl.
  *H04W 24/08* (2009.01)
  *G01S 11/00* (2006.01)
  *G01S 7/295* (2006.01)
  *H04W 84/12* (2009.01)

(56) References Cited

U.S. PATENT DOCUMENTS

| | | | |
|---|---|---|---|
| 2010/0202303 A1* | 8/2010 | Gu | H04W 64/00 370/252 |
| 2015/0094103 A1 | 4/2015 | Qi et al. | |
| 2015/0168536 A1 | 6/2015 | Leor et al. | |
| 2015/0168537 A1 | 6/2015 | Yuval et al. | |
| 2015/0179166 A1* | 6/2015 | Nagao | G06K 9/6297 704/221 |
| 2015/0341750 A1 | 11/2015 | Reynolds et al. | |
| 2015/0350936 A1 | 12/2015 | Qi et al. | |
| 2016/0119889 A1 | 4/2016 | Hongyuan et al. | |
| 2016/0366548 A1* | 12/2016 | Wang | H04W 4/023 |
| 2017/0127412 A1* | 5/2017 | Amizur | G01S 13/74 |
| 2017/0251332 A1* | 8/2017 | Aldana | G01S 5/0226 |

FOREIGN PATENT DOCUMENTS

| | | |
|---|---|---|
| CN | 105230089 A | 1/2016 |
| EP | 2144077 A2 | 1/2010 |
| WO | 2015130618 A2 | 9/2015 |
| WO | 2015134270 A1 | 9/2015 |

OTHER PUBLICATIONS

Jonathan Segev—Intel Corporation, "Wi-Fi Location SIG (WLS) Cumulative Management Minutes",dated Dec. 1, 2015, total 131 pages.

WiFi Location SIG Technical iFi Tiger Team meeting Qualcomm Oct. 2015—complete meeting minutes,total 7 pages.

Yuval Amizur et al., "Functional Requirements for NGP",Filename: Dec. 1, 2015_Intel_R0_MIMO for NGP.pptx,total 25 pages.

Extended European Search Report issued in European Application No. 17765848.1 on Nov. 9, 2018, 11 pages.

International Search Report and Written Opinion issued in International Application No. PCT/CN2017/076818 dated Apr. 28, 2017, 17 pages.

Office Action issued in Chinese Application No. 201610149119.4 dated Nov. 6, 2019, 6 pages (with English translation).

* cited by examiner

WIRELESS FIDELITY WI-FI RANGING METHOD AND SYSTEM, AND RELATED DEVICE

CROSS-REFERENCE TO RELATED APPLICATIONS

This application is a national stage of International Application No. PCT/CN2017/076818, filed on Mar. 15, 2017, which claims priority to Chinese Patent Application No. 201610149119.4, filed on Mar. 16, 2016. Both of the aforementioned applications are hereby incorporated by reference in their entireties.

TECHNICAL FIELD

The present invention relates to the field of communications technologies, and in particular, to a Wireless Fidelity Wi-Fi ranging method and system, and a related device.

BACKGROUND

A fine timing measurement (English: Fine Timing Measurement, FTM for short) protocol is a protocol for measuring a distance between a target node and a reference node in a Wireless Fidelity (English: Wireless Fidelity, Wi-Fi for short) technology. FIG. 1 is a schematic flowchart of measuring a distance between a target node and a reference node according to the FTM protocol in the prior art. Detailed descriptions of steps are as follows:

Step 1: The target node sends an initial FTM request (Initial FTM Request) frame to the reference node, to request the reference node to perform FTM.

Step 2: The reference node receives the initial FTM request frame sent by the target node, and sends an acknowledgement (English: Acknowledgement, ACK for short) message to the target node after receiving the initial FTM request frame, to acknowledge that the FTM is to be performed.

Step 3: The reference node sends a first FTM frame to the target node and records a time t1 of sending the first FTM frame.

Step 4: The target node receives the first FTM frame and records a time t2 of receiving the first FTM frame, and after receiving the first FTM frame, sends an ACK to the reference node and records a time t3 of sending the ACK.

Step 5: The reference node receives the ACK and records a time t4 of receiving the ACK, and sends a second FTM frame including t1 and t4 to the target node.

Step 6: The target node receives the second FTM frame and feeds back an ACK to the reference node, to notify the reference node that the second FTM frame is received.

Step 7: The target node obtains t1 and t4 in the second FTM frame, and calculates a distance d between the reference node and the target node based on a time sequence relationship of t1 to t4 shown in FIG. 1A, where a calculation formula is: $d=[(t4-t1)-(t3-t2)]/2 \times C$.

The prior art has the following disadvantage: Ranging efficiency is low because in a process of performing the FTM, there is a relatively large quantity of times of interactions between the reference node and the target node and a relatively long time is required for the interactions.

SUMMARY

Embodiments of the present invention disclose a Wireless Fidelity Wi-Fi ranging method and system, and a related device, so at to improve ranging efficiency.

According to a first aspect, an embodiment of the present invention provides a Wireless Fidelity Wi-Fi ranging method, and the method includes:

sending, by a target node, a ranging request frame to a reference node, to instruct the reference node to send a first null data packet NDP, where the NDP does not include data; in this case, the reference node sends the first NDP to the target node after receiving the ranging request frame, and because the first NDP does not carry a data unit, a process of sending the first NDP by the reference node does not last long;

receiving, by the target node, the first NDP sent by the reference node and recording a first NDP receiving time of receiving the first NDP, and sending a second NDP to the reference node and recording a second NDP sending time of sending the second NDP;

receiving, by the target node, a ranging response frame sent by the reference node, where the ranging response frame includes a first NDP sending time at which the reference node sends the first NDP and a second NDP receiving time at which the reference node receives the second NDP; and when there are a plurality of first NDP sending time and a plurality of second NDP receiving time, the reference node may send the plurality of first NDP sending time and the plurality of second NDP receiving time to the target node once by using one ranging response frame, or may send the plurality of first NDP sending time and the plurality of second NDP receiving time to the target node in batches by using a plurality of ranging response frames (each ranging response frame includes at least one first NDP sending time and one second NDP receiving time); and calculating, by the target node, a distance between the target node and the reference node based on the first NDP receiving time, the second NDP sending time, the first NDP sending time, and the second NDP receiving time, where the distance between the target node and the reference node is specifically obtained through calculation with reference to a time (which is obtained through calculation based on the first NDP sending time, the first NDP receiving time, the second NDP sending time, and the second NDP receiving time) during which and a speed (equal to a speed at which an electromagnetic wave is transmitted in the air) at which a signal is transmitted between the reference node and the target node.

According to the foregoing steps, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

With reference to the first aspect, in a first possible implementation of the first aspect, the receiving, by the target node, the first NDP sent by the reference node and recording a first NDP receiving time of receiving the first NDP, and sending a second NDP to the reference node and recording a second NDP sending time of sending the second NDP includes:

performing, by the target node at least twice, the step of the receiving the first NDP sent by the reference node and recording a first NDP receiving time of receiving the first NDP, and sending a second NDP to the reference node and recording a second NDP sending time of sending the second NDP.

The foregoing steps are performed a plurality of times to avoid a calculation error, so that a calculation result is more accurate.

With reference to the first possible implementation of the first aspect, in a second possible implementation of the first aspect, the receiving, by the target node, a ranging response frame sent by the reference node includes:

each time sending the second NDP to the reference node and recording the second NDP sending time of sending the second NDP, receiving, by the target node, the ranging response frame sent by the reference node.

In other words, each time sending the second NDP, the target node receives the ranging response frame sent by the reference node. For example, if the target node successively sends M (M is a natural number greater than 1) second NDPs to the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

With reference to the first possible implementation of the first aspect or the second possible implementation of the first aspect, in a third possible implementation of the first aspect, the calculating, by the target node, a distance between the target node and the reference node based on the first NDP receiving time, the second NDP sending time, the first NDP sending time, and the second NDP receiving time includes:

when there are a plurality of first NDP receiving time, a plurality of second NDP sending time, a plurality of first NDP sending time, and a plurality of second NDP receiving time, calculating an average value of the first NDP receiving time, an average value of the second NDP sending time, an average value of the first NDP sending time, and an average value of the second NDP receiving time; and calculating the distance between the target node and the reference node based on the average value of the first NDP receiving time, the average value of the second NDP sending time, the average value of the first NDP sending time, and the average value of the second NDP receiving time.

Specifically, the distance between the target node and the reference node is calculated through averaging, so that a relatively large error is avoided.

According to a second aspect, an embodiment of the present invention provides a Wireless Fidelity Wi-Fi ranging method, and the method includes:

receiving, by a reference node, a ranging request frame that is sent by a target node and that is used to instruct to send a first null data packet NDP, where the NDP does not include data;

sending, by the reference node, the first NDP to the target node and recording a first NDP sending time of sending the first NDP, and receiving a second NDP sent by the target node and recording a second NDP receiving time of receiving the second NDP; and sending, by the reference node to the target node, a ranging response frame including the first NDP sending time and the second NDP receiving time, so that the target node calculates a distance between the target node and the reference node based on a first NDP receiving time of receiving the first NDP, a second NDP sending time of sending the second NDP, the first NDP sending time, and the second NDP receiving time, where when there are a plurality of first NDP sending time and a plurality of second NDP receiving time, the reference node may send the plurality of first NDP sending time and the plurality of second NDP receiving time to the target node once by using one ranging response frame, or may send the plurality of first NDP sending time and the plurality of second NDP receiving time to the target node in batches by using a plurality of ranging response frames (each ranging response frame includes at least one first NDP sending time and one second NDP receiving time).

According to the foregoing steps, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

With reference to the second aspect, in a first possible implementation of the second aspect, the sending, by the reference node, the first NDP to the target node and recording a first NDP sending time of sending the first NDP, and receiving a second NDP sent by the target node and recording a second NDP receiving time of receiving the second NDP includes:

performing, by the reference node at least twice, the step of the sending the first NDP to the target node and recording a first NDP sending time of sending the first NDP, and receiving a second NDP sent by the target node and recording a second NDP receiving time of receiving the second NDP.

The foregoing steps are performed a plurality of times to avoid a calculation error, so that a calculation result is more accurate.

With reference to the first possible implementation of the second aspect, in a second possible implementation of the second aspect, the sending, by the reference node to the target node, a ranging response frame including the first NDP sending time and the second NDP receiving time includes:

each time receiving the second NDP sent by the target node and recording the second NDP receiving time of receiving the second NDP, sending, by the reference node to the target node, the ranging response frame including the first NDP sending time and the second NDP receiving time.

In other words, each time receiving the second NDP, the reference node sends the ranging response frame to the target node. For example, if the reference node successively receives M (M is a natural number greater than 1) second NDPs sent by the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

According to a third aspect, an embodiment of the present invention provides a device, the device is a target node, the target node includes an input apparatus, an output apparatus, a memory, and a processor, and the processor invokes a ranging program in the memory to perform the following operations:

sending a ranging request frame to a reference node by using the output apparatus, to instruct the reference node to send a first null data packet NDP, where the NDP does not include data; in this case, the reference node sends the first NDP to the target node after receiving the ranging request frame, and because the first NDP does not carry a data unit, a process of sending the first NDP by the reference node does not last long;

receiving, by using the input apparatus, the first NDP sent by the reference node and recording a first NDP receiving time of receiving the first NDP, and sending a second NDP to the reference node by using the output apparatus and recording a second NDP sending time of sending the second NDP;

receiving, by using the input apparatus, a ranging response frame sent by the reference node, where the ranging response frame includes a first NDP sending time at which the reference node sends the first NDP and a second NDP receiving time at which the reference node receives the second NDP; and when there are a plurality of first NDP sending time and a plurality of second NDP receiving time, the reference node may send the plurality of first NDP sending time and the plurality of second NDP receiving time to the target node once by using one ranging response frame, or may send the plurality of first NDP sending time and the plurality of second NDP receiving time to the target node in batches by using a plurality of ranging response frames (each ranging response frame includes at least one first NDP sending time and one second NDP receiving time); and calculating a distance between the target node and the reference node based on the first NDP receiving time, the second NDP sending time, the first NDP sending time, and the second NDP receiving time, where the distance between the target node and the reference node is specifically obtained through calculation with reference to a time (which is obtained through calculation based on the first NDP sending time, the first NDP receiving time, the second NDP sending time, and the second NDP receiving time) during which and a speed (equal to a speed at which an electromagnetic wave is transmitted in the air) at which a signal is transmitted between the reference node and the target node.

According to the foregoing operations, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

The foregoing operations are performed a plurality of times to avoid a calculation error, so that a calculation result is more accurate.

With reference to the first possible implementation of the third aspect, in a second possible implementation of the third aspect, that the processor receives, by using the input apparatus, a ranging response frame sent by the reference node is specifically as follows:

each time sending the second NDP to the reference node by using the output apparatus and recording the second NDP sending time of sending the second NDP, the processor receives, by using the input apparatus, the ranging response frame sent by the reference node.

In other words, each time sending the second NDP, the target node receives the ranging response frame sent by the reference node. For example, if the target node successively sends M (M is a natural number greater than 1) second NDPs to the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

With reference to the first possible implementation of the third aspect or the second possible implementation of the third aspect, in a third possible implementation of the third aspect, that the processor calculates a distance between the target node and the reference node based on the first NDP receiving time, the second NDP sending time, the first NDP sending time, and the second NDP receiving time is specifically as follows:

when there are a plurality of first NDP receiving time, a plurality of second NDP sending time, a plurality of first NDP sending time, and a plurality of second NDP receiving time, calculating an average value of the first NDP receiving time, an average value of the second NDP sending time, an average value of the first NDP sending time, and an average value of the second NDP receiving time; and calculating the distance between the target node and the reference node based on the average value of the first NDP receiving time, the average value of the second NDP sending time, the average value of the first NDP sending time, and the average value of the second NDP receiving time.

Specifically, the distance between the target node and the reference node is calculated through averaging, so that a relatively large error is avoided.

According to a fourth aspect, an embodiment of the present invention provides a device, the device is a reference node, the reference node includes an input apparatus, an output apparatus, a memory, and a processor, and the processor invokes a ranging program in the memory to perform the following operations:

receiving, by using the input apparatus, a ranging request frame that is sent by a target node and that is used to instruct to send a first null data packet NDP, where the NDP does not include data; sending the first NDP to the target node by using the output apparatus and recording a first NDP sending time of sending the first NDP, and receiving, by using the input apparatus, a second NDP sent by the target node and recording a second NDP receiving time of receiving the second NDP; and sending, to the target node by using the output apparatus, a ranging response frame including the first NDP sending time and the second NDP receiving time, so that the target node calculates a distance between the target node and the reference node based on a first NDP receiving time of receiving the first NDP, a second NDP sending time of sending the second NDP, the first NDP sending time, and the second NDP receiving time, where when there are a plurality of first NDP sending time and a plurality of second NDP receiving time, the reference node may send the plurality of first NDP sending time and the plurality of second NDP receiving time to the target node once by using one ranging response frame, or may send the plurality of first NDP sending time and the plurality of second NDP receiving time to the target node in batches by using a plurality of ranging response frames (each ranging response frame includes at least one first NDP sending time and one second NDP receiving time).

According to the foregoing steps, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

With reference to the fourth aspect, in a first possible implementation of the fourth aspect, that the processor sends the first NDP to the target node by using the output apparatus and records a first NDP sending time of sending the first NDP, and receives, by using the input apparatus, a second NDP sent by the target node and records a second NDP receiving time of receiving the second NDP is specifically as follows:

performing, at least twice, the step of the sending the first NDP to the target node by using the output apparatus and recording a first NDP sending time of sending the first NDP, and receiving, by using the input apparatus, a second NDP sent by the target node and recording a second NDP receiving time of receiving the second NDP.

The foregoing steps are performed a plurality of times to avoid a calculation error, so that a calculation result is more accurate.

With reference to the fourth aspect, in a second possible implementation of the fourth aspect, that the processor sends, to the target node by using the output apparatus, a ranging response frame including the first NDP sending time and the second NDP receiving time is specifically as follows:

each time receiving, by using the input apparatus, the second NDP sent by the target node and recording the second NDP receiving time of receiving the second NDP, the processor sends, to the target node by using the output apparatus, the ranging response frame including the first NDP sending time and the second NDP receiving time.

In other words, each time receiving the second NDP, the reference node sends the ranging response frame to the target node. For example, if the reference node successively receives M (M is a natural number greater than 1) second NDPs sent by the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

With reference to the implementations of the first aspect, the implementations of the second aspect, the implementations of the third aspect, or the implementations of the fourth aspect, in some possible implementations, a physical layer frame header or a Media Access Control layer frame header of the ranging request frame includes information used to indicate a quantity of times that the reference node performs the step of the sending the first NDP to the target node and recording a first NDP sending time of sending the first NDP, and receiving a second NDP sent by the target node and recording a second NDP receiving time of receiving the second NDP.

Specifically, the physical layer frame header or the Media Access Control layer frame header of the ranging request frame indicates the quantity of times of performing the foregoing step, so that the reference node can quickly obtain the information about the quantity of times and perform a corresponding step based on the information about the quantity of times.

In some possible implementations of the first aspect, some possible implementations of the second aspect, some possible implementations of the third aspect, or some possible implementations of the fourth aspect, the physical layer frame header or the Media Access Control layer frame header of the ranging request frame includes information used to instruct the reference node to send the first NDP.

Specifically, the physical layer frame header or the Media Access Control layer frame header of the ranging request frame is used to instruct the reference node to send the first NDP, so that the reference node can send the first NDP based on the instruction in a timely manner.

According to a fifth aspect, an embodiment of the present invention provides a device, and the device includes a function unit that is configured to perform some or all steps of any implementation of the first aspect of the embodiments of the present invention.

According to a sixth aspect, an embodiment of the present invention provides a device, and the device includes a function unit that is configured to perform some or all steps of any implementation of the second aspect of the embodiments of the present invention.

According to a seventh aspect, an embodiment of the present invention provides a Wireless Fidelity Wi-Fi ranging system, and the ranging system includes a target node and a reference node;

the target node is configured to send a ranging request frame to the reference node;

the reference node is configured to: receive the ranging request frame sent by the target node, and send a first null data packet NDP to the target node based on the ranging request frame and record a first NDP sending time of sending the first NDP;

the target node is further configured to: receive the first NDP sent by the reference node and record a first NDP receiving time of receiving the first NDP, and send a second NDP to the reference node and record a second NDP sending time of sending the second NDP;

the reference node is further configured to: receive the second NDP sent by the target node and record a second NDP receiving time of receiving the second NDP; and send, to the target node, a ranging response frame including the first NDP sending time and the second NDP receiving time; and the target node is further configured to: receive the ranging response frame sent by the reference node, and obtain the first NDP sending time and the second NDP receiving time in the ranging response frame through parsing; and calculate a distance between the target node and the reference node based on the first NDP receiving time, the second NDP sending time, the first NDP sending time, and the second NDP receiving time.

Optionally, the target node described in the seventh aspect may be the device described in any possible implementation of the third aspect or any possible implementation of the fifth aspect; and the reference node described in the seventh aspect may be the device described in any possible implementation of the fourth aspect or any possible implementation of the sixth aspect.

According to the embodiments of the present invention, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

Both a reference node and a target node described in embodiments of the present invention are terminal devices (for example, an access point (English: Access Point, AP for short), a station (English: Station, STA for short), and the like) that communicate based on a Wi-Fi technology. The following describes in detail the technical solutions in the embodiments of the present invention with reference to the accompanying drawings of the present invention.

Figure 1:
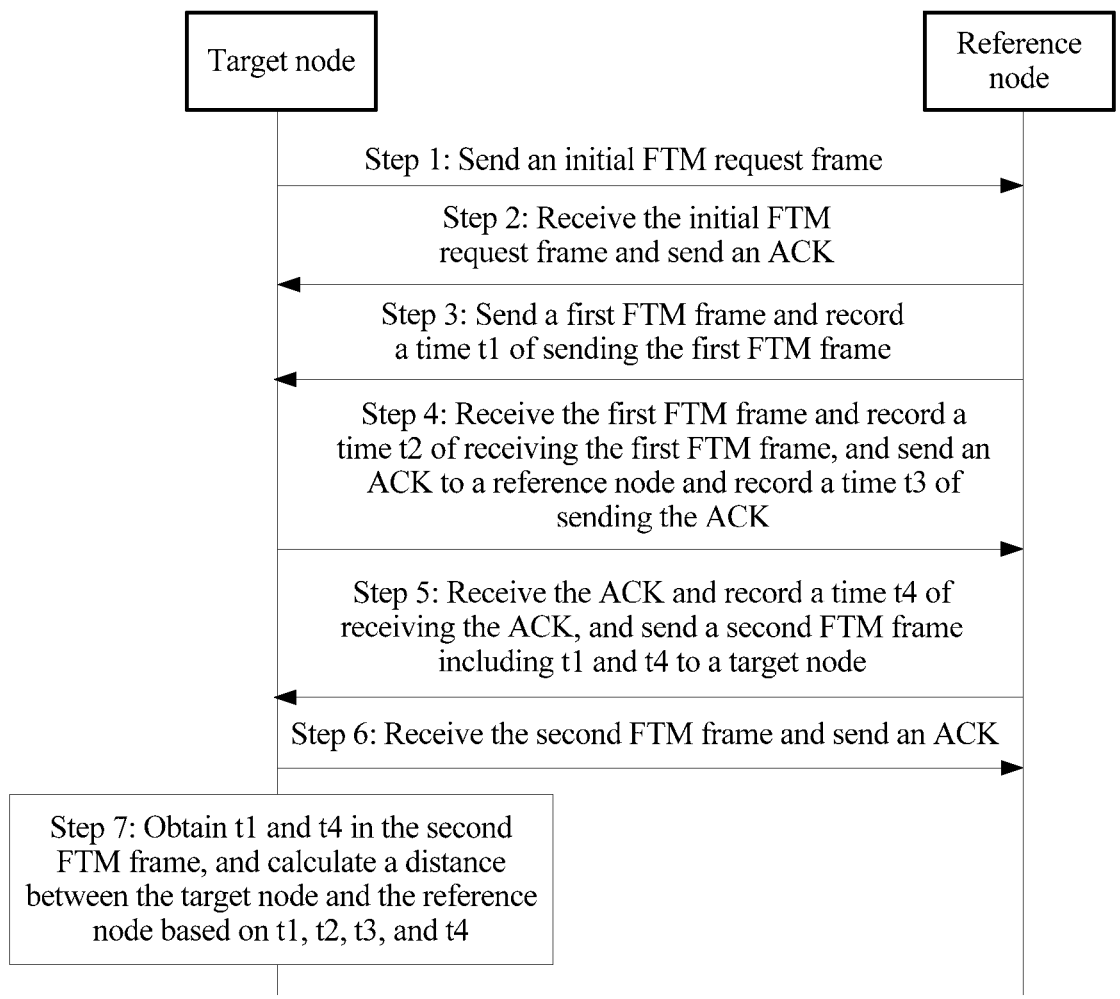
FIG. 1 is a schematic flowchart of measuring a distance between a target node and a reference node in the prior art.
Figure 1A:
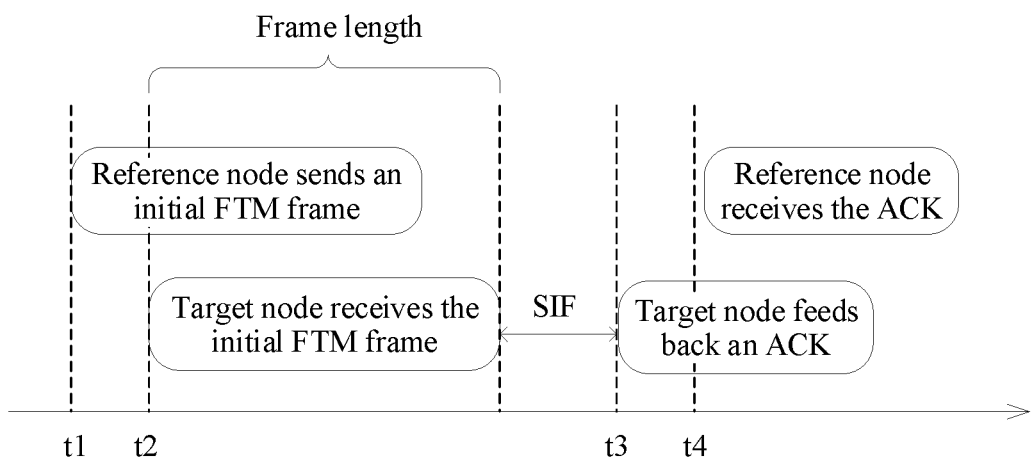
FIG. 1A is a schematic diagram of a time sequence between a target node and a reference node in the prior art.
Figure 2:
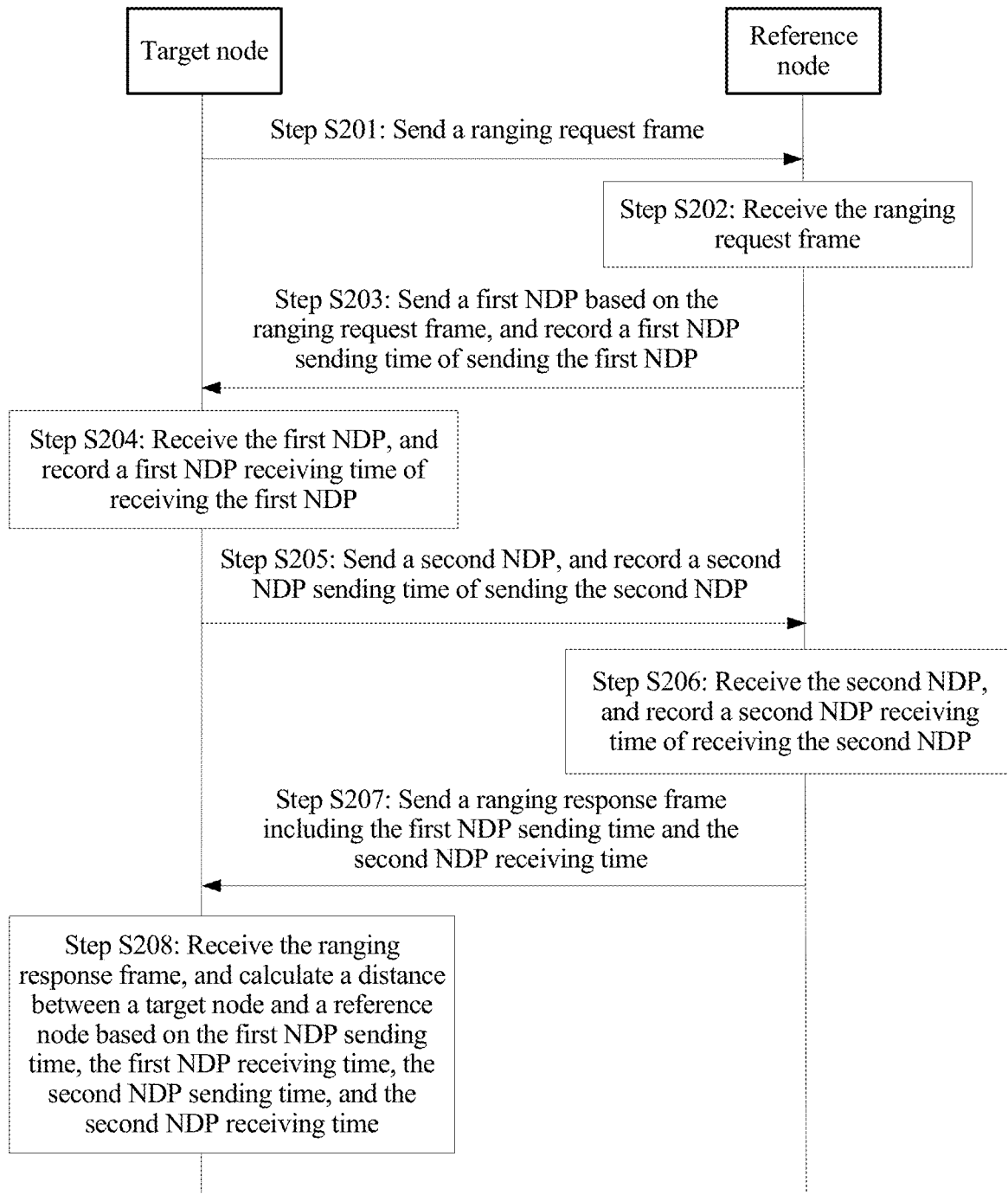
FIG. 2 is a schematic interaction diagram of a Wireless Fidelity Wi-Fi ranging method according to an embodiment of the present invention.

Referring to FIG. 2, FIG. 2 is a schematic flowchart of a Wi-Fi ranging method according to an embodiment of the present invention. The method includes but is not limited to the following steps.

Step S201: A target node sends a ranging request frame to a reference node, to instruct the reference node to send a first null data packet NDP.

Specifically, the target node may be manually triggered to send the ranging request frame to the reference node, or the target node may send the ranging request frame to the reference node when determining that an indicator parameter of the target node reaches a preset condition. Certainly, there is still another manner to trigger the target node to send the ranging request frame to the reference node. Details are not described herein. The ranging request frame includes indication information used to instruct the reference node to send the first null data packet (English: Null Data Packet, NDP for short) to the target node. The indication information may be encapsulated in a physical (English: Physical, PHY for short) layer frame header, a Media Access Control (English: Media Access Control, MAC for short) layer frame header, or a MAC protocol data unit (English: MAC Protocol Data Unit, MPDU for short) of the ranging request frame. When the indication information is encapsulated in the PHY layer frame header or the MAC layer frame header of the ranging request frame, the reference node can obtain the indication information in a more timely manner and respond based on the indication information.

Further, when the indication information is indicated at a PHY layer, the indication information may be specifically indicated by one or more bits in a high efficient Wi-Fi (English: High Efficient Wi-Fi, HEW for short) signal A (English: Signal A, SIGA for short) HE-SIGA field in a PHY frame header. When the indication information is indicated at a MAC layer, the indication information may be specifically indicated by one or more bits in a frame control (Frame Control) field or a high throughput (English: High Throughput, HT for short) control (HT Control) field in a MAC frame header. For example, the indication information is indicated by one bit in a reserved (Reserved) field of the HT control field, and a value 1 of the reserved field is used to instruct to "send the first null data packet NDP to the target node". A structure of the HT control field is shown in Table 1:

TABLE 1

| Link adaptation control | Calibration position | Calibration sequence | Reserved | Channel state information/ diversion | NDP notification | Reserved | Access category constraint | Reverse license/more physical layer protocol data units |
|---|---|---|---|---|---|---|---|---|

Step S202: The reference node receives the ranging request frame.

Step S203: The reference node sends the first null data packet NDP to the target node based on an indication of the ranging request frame, and records a first NDP sending time of sending the first NDP.

Specifically, when receiving the ranging request frame sent by the target node, the reference node analyzes the ranging request frame, and when learning that the ranging request frame is used to instruct the reference node to send the first NDP, the reference node immediately sends the first NDP to the target node. In this embodiment of the present invention, because sending the first NDP further plays an ACK role, the reference node does not send an ACK after receiving the ranging request frame. Further, because neither the first NDP nor a second NDP subsequently described carries data, transmission duration of the first NDP and transmission duration of the second NDP are shorter than that of an "initial FTM frame" and that of an "acknowledgement (ACK) message" in the prior art. A time at which the reference node sends the first NDP is the first NDP sending time. Optionally, a process of sending the first NDP by the reference node lasts for a period of time, and a start point of the period of time is the first NDP sending time.

Step S204: The target node receives the first NDP sent by the reference node, and records a first NDP receiving time of receiving the first NDP.

Specifically, a time at which the reference node receives the first NDP is the first NDP receiving time. Optionally, a process of receiving the first NDP by the target node lasts for a period of time, and a start point of the period of time is the first NDP receiving time.

Step S205: The target node sends a second NDP to the reference node, and records a second NDP sending time of sending the second NDP.

Specifically, the target node immediately sends the second NDP to the reference node after receiving the first NDP. A time at which the target terminal sends the second NDP is the second NDP sending time. Optionally, a process of sending the second NDP by the target node lasts for a period of time, and a start point of the period of time is the second NDP sending time. In this embodiment of the present invention, the target terminal does not need to reply with an ACK after receiving the first NDP, and the second NDP may play an ACK role.

Step S206: The reference node receives the second NDP sent by the target node, and records a second NDP receiving time of receiving the second NDP.

Specifically, a time at which the reference terminal receives the second NDP is the second NDP receiving time. Optionally, a process of receiving the second NDP by the reference node lasts for a period of time, and a start point of the period of time is the second NDP receiving time.

Step S207: The reference node sends, to the target node, a ranging response frame including the first NDP sending time and the second NDP receiving time.

Specifically, the reference node sends the recorded first NDP sending time and the recorded second NDP receiving time to the target node by using the ranging response frame, so that the target node calculates a distance between the target node and the reference node.

In an optional solution, steps S203, S204, S205, and S206 may be repeatedly performed N times in sequence. For example, after S203, S204, S205, and S206 are performed in sequence, S203 returns to be performed, and S203, S204, S205, and S206 are cyclically performed N (N is an integer greater than 1) times in this rule. The N times may be a value pre-defined in a ranging protocol used by both the reference node and the target node, and the reference node and the target node perform S203, S204, S205, and S206 N times by default. Alternatively, the N times may be information encapsulated in the ranging request frame when the target node sends the ranging request frame to the reference node. In this case, after receiving the ranging request frame, the reference node may know a quantity of times of performing S203, S204, S205, and S206 with the target node. Further, the information indicating the quantity of times of performing S203, S204, S205, and S206 may be encapsulated in a PHY layer frame header, a MAC layer frame header, or an MPDU of the ranging request frame. Preferably, in this embodiment of the present invention, the information is encapsulated in the PHY layer frame header or the MAC layer frame header of the ranging request frame, so that the reference node obtains, in a timely manner, an indication of the quantity of times of performing steps S203, S204, S205, and S206.

Figure 2A:
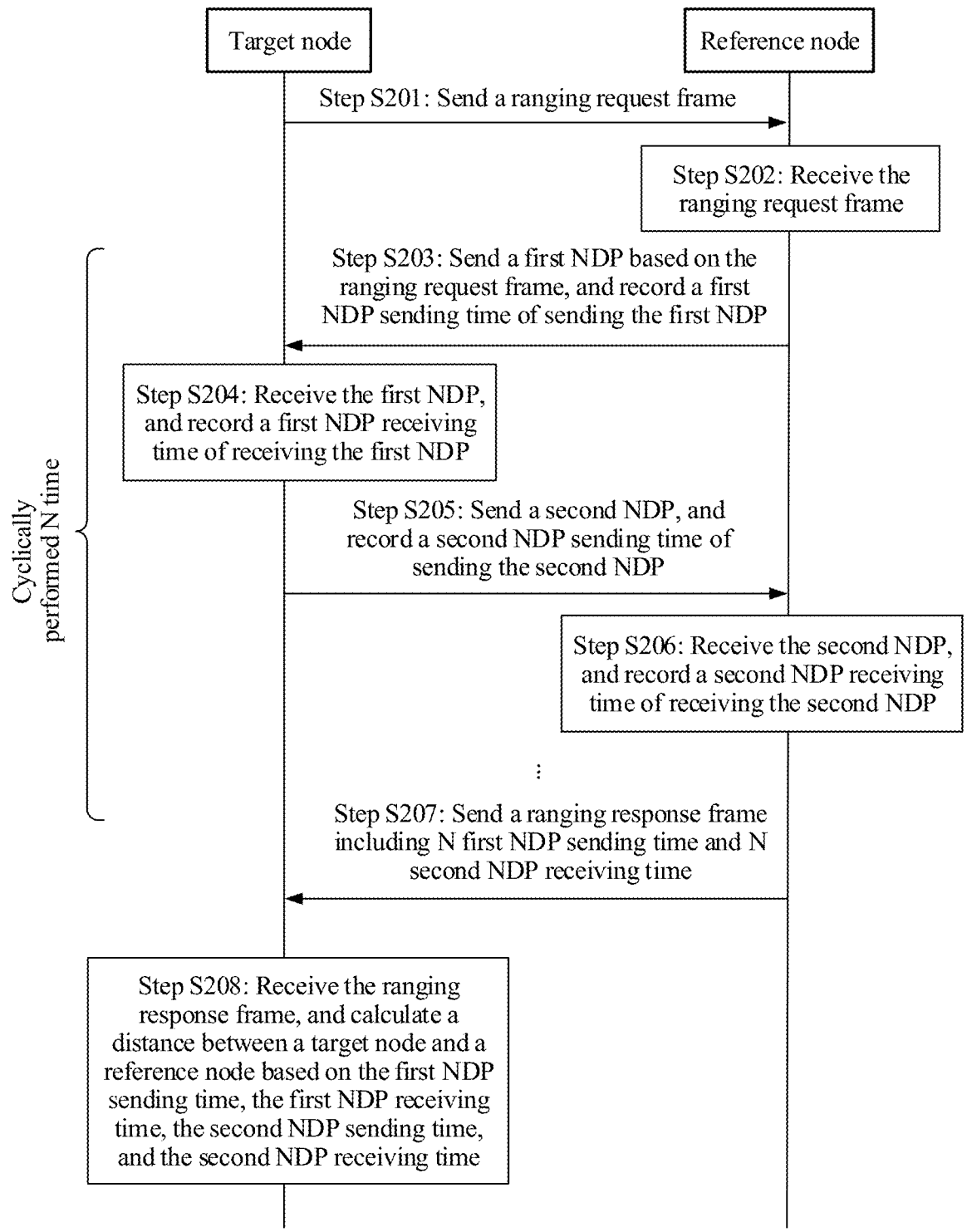
FIG. 2A is a schematic interaction diagram of another Wireless Fidelity Wi-Fi ranging method according to an embodiment of the present invention.

There are at least two manners for step S207 when steps S203, S204, S205, and S206 are cyclically performed N times. Detailed descriptions of the two manners are as follows:

Manner 1: After steps S203, S204, S205, and S206 are cyclically performed N times, the reference node sends, to the target node by using the ranging response frame, first NDP sending time and second NDP receiving time that are recorded N times. A specific procedure is shown in FIG. 2A.

Figure 2B:
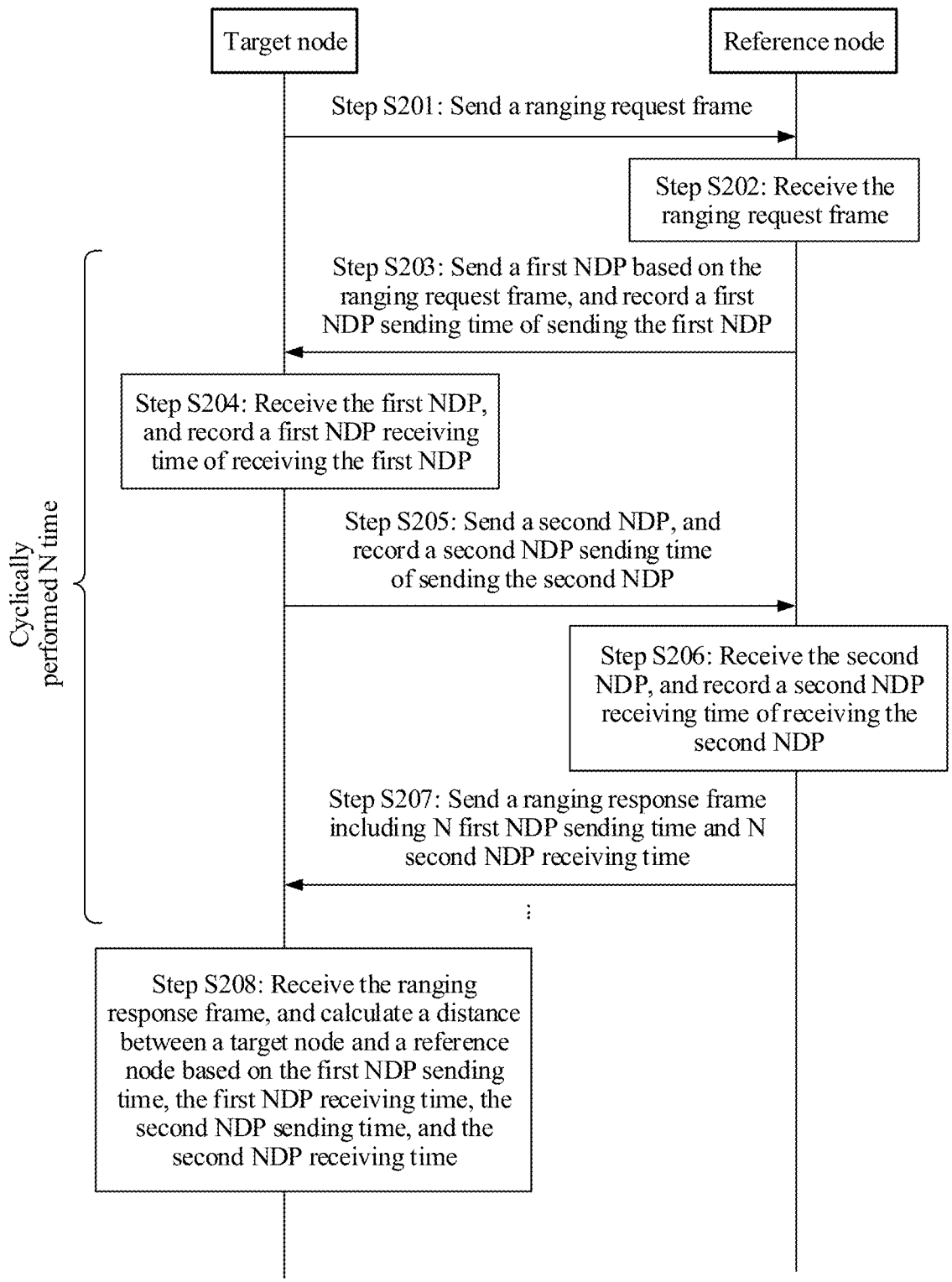
FIG. 2B is a schematic interaction diagram of another Wireless Fidelity Wi-Fi ranging method according to an embodiment of the present invention.

Manner 2: In a process of cyclically performing steps S203, S204, S205, and S206, each time completing step S206, the reference node sends, to the target node by using the ranging response frame, the first NDP sending time and the second NDP receiving time that are recorded in this cycle. If steps S203, S204, S205, and S206 are cyclically performed N times, the reference node sends N ranging response frames to the target node. A specific procedure is shown in FIG. 2B. N first NDP sending time and N second NDP receiving time are sent N times, so as to avoid a risk caused by a signal loss in a process of sending the N first NDP sending time and the N second NDP receiving time together.

Step S208: The target node receives the ranging response frame sent by the reference node, and obtains the first NDP sending time and the second NDP receiving time in the ranging response frame; and calculates a distance between the target node and the reference node based on the first NDP sending time, the first NDP receiving time, the second NDP sending time, and the second NDP receiving time.

Specifically, if the first NDP sending time is t1, the first NDP receiving time is t2, the second NDP sending time is t3, and the second NDP receiving time is t4, the distance d between the target node and the reference node may be calculated in the following manners:

If steps S203, S204, S205, and S206 are performed only once, d may be obtained through calculation by using a formula 1-1:

$$d = [(t4-t1)-(t3-t2)] \times c \qquad 1\text{-}1$$

In the formula 1-1, $[(t4-t1)-(t3-t2)]$ is duration for which an NDP is sent from the reference node to the target node (or an NDP is sent from the target node to the reference node), c is a speed (equal to a speed at which an electromagnetic wave is transmitted in the air) at which the NDP is transmitted in the air, and c is a known quantity in the prior art.

If steps S203, S204, S205, and S206 are performed N times, an average value of N pieces of t1 obtained N times is calculated and used as t1 in the formula 1-1, an average value of N pieces of t2 is calculated and used as t2 in the formula 1-1, an average value of N pieces of t3 is calculated and used as t3 in the formula 1-1, an average value of N pieces of t4 is calculated and used as t4 in the formula 1-1, and then d is calculated based on the formula 1-1. If step S207 is performed in "manner 2", there may not be N pieces of t1 and t4 that are finally obtained. However, regardless of quantities of t1 and t4, an average value is calculated based on an actual quantity during calculation. After the average value is calculated, d is also obtained through calculation by using the formula 1-1.

It should be noted that, in the above-described calculation manner, average values of t1, t2, t3, and t4 are first calculated, and then d is obtained through calculation by substituting the average values into the formula 1-1. It may be understood that d may alternatively be first obtained through calculation by using the formula 1-1 based on t1, t2, t3, and t4 in each cycle, and finally an average value of d obtained through calculation in each cycle is calculated and used as the distance d between the target node and the reference node in this embodiment of the present invention.

In the method described in FIG. 2, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

The method in the embodiment of the present invention is described in detail above. For ease of better implementing the foregoing solution in the embodiment of the present invention, related apparatuses in embodiments of the present invention are described below with reference to FIG. 3 to FIG. 6.

Figure 3:
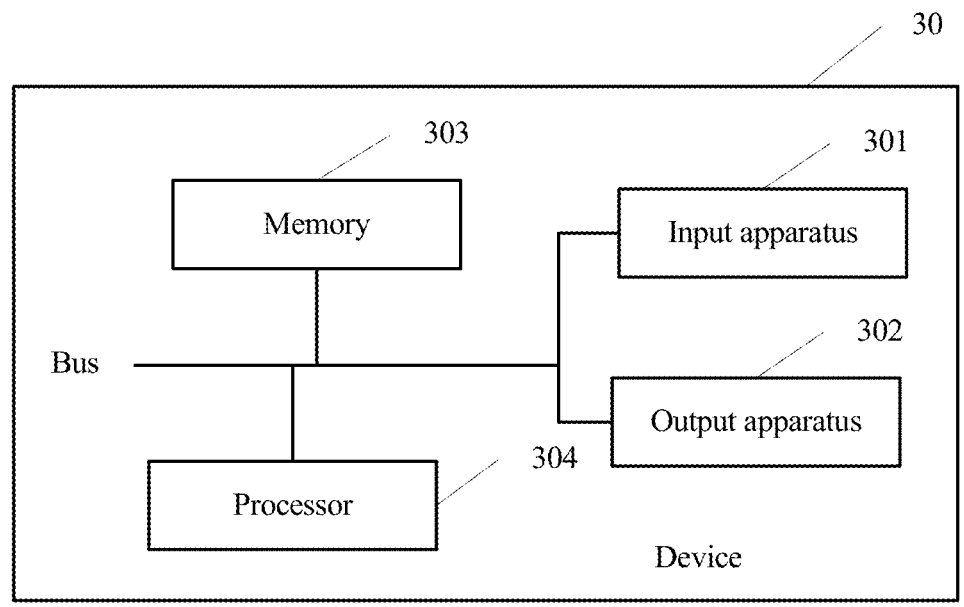
FIG. 3 is a schematic structural diagram of a device according to an embodiment of the present invention.

Referring to FIG. 3, FIG. 3 is a device 30 according to an embodiment of the present invention. The device 30 is a target node (for example, an access point AP or a station STA). The device 30 includes an input apparatus 301, an output apparatus 302, a memory 303, and a processor 304 (there may be one or more processors 304, and one processor is used as an example in FIG. 3). In some embodiments of the present invention, the input apparatus 301, the output apparatus 302, the memory 303, and the processor 304 may be connected by using a bus or in another manner. A bus connection is used as an example in FIG. 3. The processor 304 invokes a ranging program in the memory 303 to perform the following operations:

sending a ranging request frame to a reference node by using the output apparatus 302, to instruct the reference node to send a first null data packet NDP;

receiving, by using the input apparatus 301, the first NDP sent by the reference node and recording a first NDP receiving time of receiving the first NDP, and sending a second NDP to the reference node by using the output apparatus 302 and recording a second NDP sending time of sending the second NDP;

receiving, by using the input apparatus 301, a ranging response frame sent by the reference node, where the ranging response frame includes a first NDP sending time at which the reference node sends the first NDP and a second NDP receiving time at which the reference node receives the second NDP; and calculating a distance between the target node and the reference node based on the first NDP receiving time, the second NDP sending time, the first NDP sending time, and the second NDP receiving time.

According to the foregoing operations, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

In an optional solution, that the processor 304 receives, by using the input apparatus 301, the first NDP sent by the reference node and records a first NDP receiving time of receiving the first NDP, and sends a second NDP to the reference node by using the output apparatus 302 and records a second NDP sending time of sending the second NDP is specifically as follows:

performing, at least twice, the step of the receiving, by using the input apparatus 301, the first NDP sent by the reference node and recording a first NDP receiving time of receiving the first NDP, and sending a second NDP to the reference node by using the output apparatus 302 and recording a second NDP sending time of sending the second NDP.

The processor 304 performs the foregoing operations a plurality of times to avoid a calculation error, so that a calculation result is more accurate.

In another optional solution, that the processor 304 receives, by using the input apparatus 301, a ranging response frame sent by the reference node is specifically as follows:

each time sending the second NDP to the reference node by using the output apparatus 302 and recording the second NDP sending time of sending the second NDP, the processor 304 receives, by using the input apparatus 301, the ranging response frame sent by the reference node.

In other words, each time sending the second NDP, the target node receives the ranging response frame sent by the reference node. For example, if the target node successively sends M (M is a natural number greater than 1) second NDPs to the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

In another optional solution, that the processor 304 calculates a distance between the target node and the reference node based on the first NDP receiving time, the second NDP sending time, the first NDP sending time, and the second NDP receiving time is specifically as follows:

when there are a plurality of first NDP receiving time, a plurality of second NDP sending time, a plurality of first NDP sending time, and a plurality of second NDP receiving time, calculating an average value of the first NDP receiving time, an average value of the second NDP sending time, an average value of the first NDP sending time, and an average value of the second NDP receiving time; and calculating the distance between the target node and the reference node based on the average value of the first NDP receiving time, the average value of the second NDP sending time, the average value of the first NDP sending time, and the average value of the second NDP receiving time.

Specifically, the distance between the target node and the reference node is calculated through averaging, so that a relatively large error is avoided.

In another optional solution, a physical layer frame header or a Media Access Control layer frame header of the ranging request frame includes information used to indicate a quantity of times that the reference node performs a step of sending the first NDP to the input apparatus 301 and recording the first NDP sending time of sending the first NDP, and receiving the second NDP sent by the output apparatus 302 and recording the second NDP receiving time of receiving the second NDP.

Specifically, the physical layer frame header or the Media Access Control layer frame header of the ranging request frame indicates the quantity of times of performing the foregoing step, so that the reference node can quickly obtain the information about the quantity of times and perform a corresponding step based on the information about the quantity of times.

In another optional solution, the physical layer frame header or the Media Access Control layer frame header of the ranging request frame includes information used to instruct the reference node to send the first NDP.

Specifically, the physical layer frame header or the Media Access Control layer frame header of the ranging request frame is used to instruct the reference node to send the first NDP, so that the reference node can send the first NDP based on the instruction in a timely manner.

It should be noted that, for specific implementation of the device 30 shown in FIG. 3, refer to the corresponding method embodiment shown in FIG. 2, and details are not described herein again.

Figure 4:
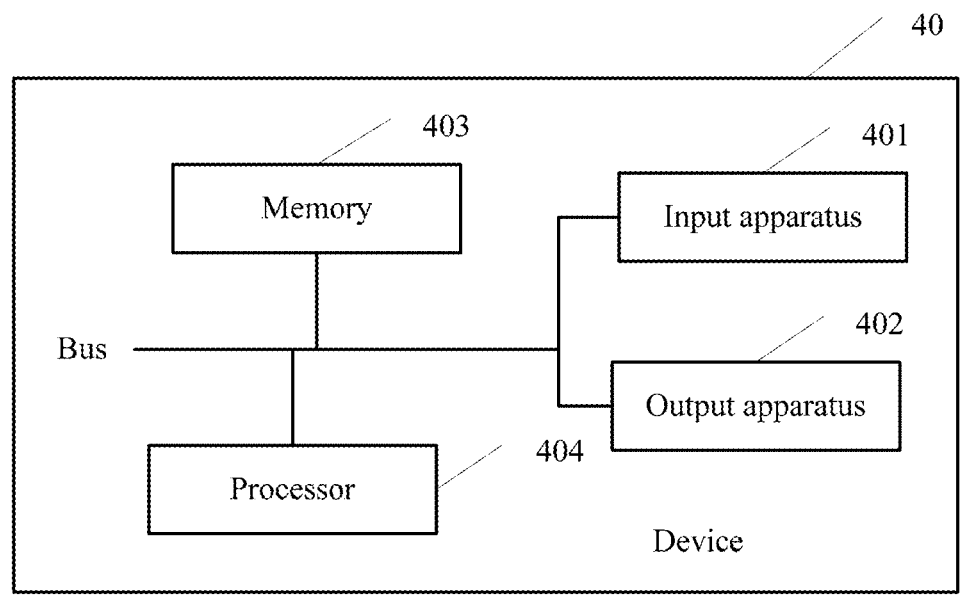
FIG. 4 is a schematic structural diagram of a device according to an embodiment of the present invention.

Referring to FIG. 4, FIG. 4 is a device 40 according to an embodiment of the present invention. The device 40 is a target node (for example, an access point AP or a station STA). The device 40 includes an input apparatus 401, an output apparatus 402, a memory 403, and a processor 404 (there may be one or more processors 404, and one processor is used as an example in FIG. 4). In some embodiments of the present invention, the input apparatus 401, the output apparatus 402, the memory 403, and the processor 404 may be connected by using a bus or in another manner. A bus connection is used as an example in FIG. 4. The processor 404 invokes a ranging program in the memory 403 to perform the following operations:

receiving, by using the input apparatus 401, a ranging request frame that is sent by a target node and that is used to instruct to send a first null data packet NDP;

sending the first NDP to the target node by using the output apparatus 402 and recording a first NDP sending time of sending the first NDP, and receiving, by using the input apparatus 401, a second NDP sent by the target node and recording a second NDP receiving time of receiving the second NDP; and sending, to the target node by using the output apparatus 402, a ranging response frame including the first NDP sending time and the second NDP receiving time, so that the target node calculates a distance between the target node and the reference node based on a first NDP receiving time of receiving the first NDP, a second NDP sending time of sending the second NDP, the first NDP sending time, and the second NDP receiving time.

According to the foregoing operations, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

In an optional solution, that the processor 404 sends the first NDP to the target node by using the output apparatus 402 and records a first NDP sending time of sending the first NDP, and receives, by using the input apparatus 401, a second NDP sent by the target node and records a second NDP receiving time of receiving the second NDP is specifically as follows:

performing, at least twice, the step of the sending the first NDP to the target node by using the output apparatus 402 and recording a first NDP sending time of sending the first NDP, and receiving, by using the input apparatus 401, a second NDP sent by the target node and recording a second NDP receiving time of receiving the second NDP.

The processor 404 performs the foregoing operations a plurality of times to avoid a calculation error, so that a calculation result is more accurate.

In another optional solution, that the processor 404 sends, to the target node by using the output apparatus 402, a ranging response frame including the first NDP sending time and the second NDP receiving time is specifically as follows:

each time receiving, by using the input apparatus 401, the second NDP sent by the target node and recording the second NDP receiving time of receiving the second NDP, the processor 404 sends, to the target node by using the output apparatus 402, the ranging response frame including the first NDP sending time and the second NDP receiving time.

In other words, each time receiving the second NDP, the reference node sends the ranging response frame to the target node. For example, if the reference node successively receives M (M is a natural number greater than 1) second NDPs sent by the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

In another optional solution, a physical layer frame header or a Media Access Control layer frame header of the ranging request frame includes information used to indicate a quantity of times that the processor 404 performs the step of the sending the first NDP to the target node by using the output apparatus 402 and recording a first NDP sending time of sending the first NDP, and receiving, by using the input apparatus 401, a second NDP sent by the target node and recording a second NDP receiving time of receiving the second NDP.

Specifically, the physical layer frame header or the Media Access Control layer frame header of the ranging request frame indicates the quantity of times of performing the foregoing step, so that the reference node can quickly obtain the information about the quantity of times and perform a corresponding step based on the information about the quantity of times.

In another optional solution, the physical layer frame header or the Media Access Control layer frame header of the ranging request frame includes information used to instruct the reference node to send the first NDP.

Specifically, the physical layer frame header or the Media Access Control layer frame header of the ranging request frame is used to instruct the reference node to send the first NDP, so that the reference node can send the first NDP based on the instruction in a timely manner.

It should be noted that, for specific implementation of the device 40 shown in FIG. 4, refer to the corresponding method embodiment shown in FIG. 2, and details are not described herein again.

Figure 5:
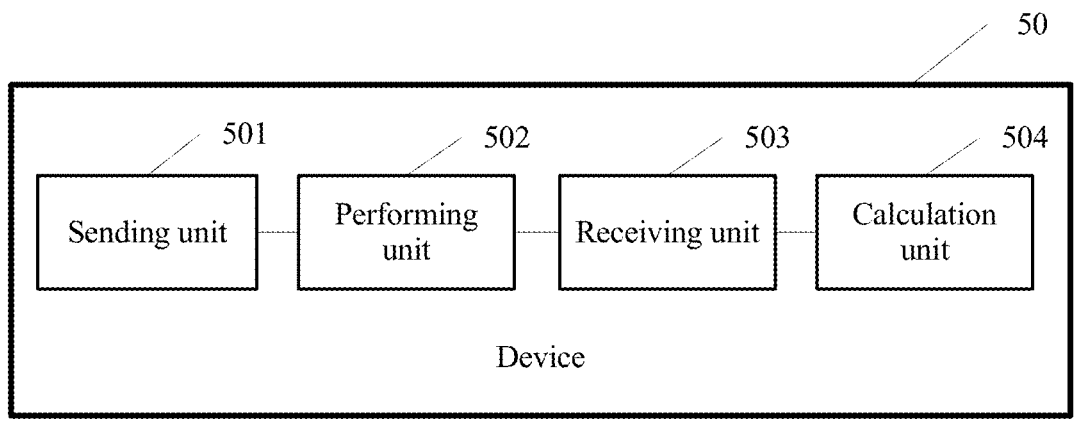
FIG. 5 is a schematic structural diagram of a device according to an embodiment of the present invention.

Referring to FIG. 5, FIG. 5 is a device 50 according to an embodiment of the present invention. The device 50 is a target node (for example, an access point AP or a station STA). The target node includes a sending unit 501, a performing unit 502, a receiving unit 503, and a calculation unit 504. Detailed descriptions of the units are as follows:

The sending unit 501 is configured to send a ranging request frame to a reference node, to instruct the reference node to send a first null data packet NDP.

The performing unit 502 is configured to: receive the first NDP sent by the reference node and record a first NDP receiving time of receiving the first NDP, and send a second NDP to the reference node and record a second NDP sending time of sending the second NDP.

The receiving unit 503 is configured to receive a ranging response frame sent by the reference node, where the ranging response frame includes a first NDP sending time at which the reference node sends the first NDP and a second NDP receiving time at which the reference node receives the second NDP.

The calculation unit 504 is configured to calculate a distance between the target node and the reference node based on the first NDP receiving time, the second NDP sending time, the first NDP sending time, and the second NDP receiving time.

According to the foregoing units, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

In an optional solution, the performing unit 502 is specifically configured to perform, at least twice, the step of the receiving the first NDP sent by the reference node and recording a first NDP receiving time of receiving the first NDP, and sending a second NDP to the reference node and recording a second NDP sending time of sending the second NDP.

The foregoing operations are performed a plurality of times to avoid a calculation error, so that a calculation result is more accurate.

In another optional solution, the receiving unit 503 is specifically configured to: each time sending the second NDP to the reference node and recording the second NDP sending time of sending the second NDP, receive the ranging response frame sent by the reference node.

In other words, each time sending the second NDP, the target node receives the ranging response frame sent by the reference node. For example, if the target node successively sends M (M is a natural number greater than 1) second NDPs to the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

In another optional solution, the calculation unit 504 includes a first calculation subunit and a second calculation subunit, and detailed descriptions of the first calculation subunit and the second calculation subunit are as follows:

The first calculation subunit is configured to: when there are a plurality of first NDP receiving time, a plurality of second NDP sending time, a plurality of first NDP sending time, and a plurality of second NDP receiving time, calculate an average value of the first NDP receiving time, an average value of the second NDP sending time, an average value of the first NDP sending time, and an average value of the second NDP receiving time.

The second calculation subunit is configured to calculate the distance between the target node and the reference node based on the average value of the first NDP receiving time, the average value of the second NDP sending time, the average value of the first NDP sending time, and the average value of the second NDP receiving time.

Specifically, the distance between the target node and the reference node is calculated through averaging, so that a relatively large error is avoided.

In another optional solution, a physical layer frame header or a Media Access Control layer frame header of the ranging request frame includes information used to indicate a quantity of times that the reference node performs a step of sending the first NDP to the target node and recording the first NDP sending time of sending the first NDP, and receiving the second NDP sent by the target node and recording the second NDP receiving time of receiving the second NDP.

Specifically, the physical layer frame header or the Media Access Control layer frame header of the ranging request frame indicates the quantity of times of performing the foregoing step, so that the reference node can quickly obtain the information about the quantity of times and perform a corresponding step based on the information about the quantity of times.

In another optional solution, the physical layer frame header or the Media Access Control layer frame header of the ranging request frame includes information used to instruct the reference node to send the first NDP.

Specifically, the physical layer frame header or the Media Access Control layer frame header of the ranging request frame is used to instruct the reference node to send the first NDP, so that the reference node can send the first NDP based on the instruction in a timely manner.

It should be noted that, for specific implementation of the device 50 shown in FIG. 5, refer to the corresponding description in the method embodiment in FIG. 2, and details are not described herein again.

Figure 6:
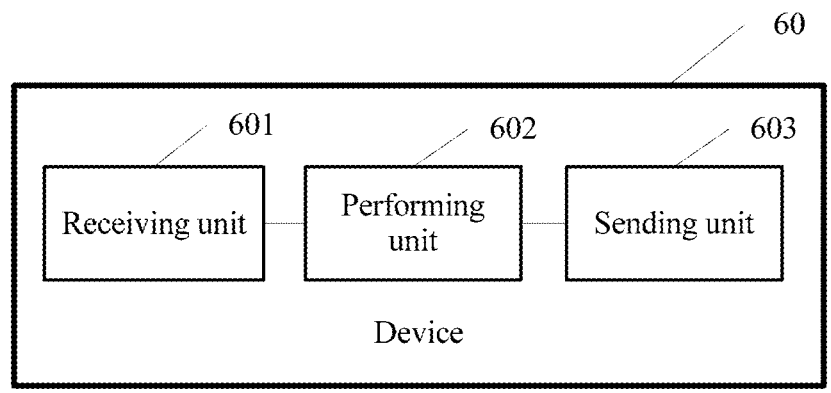
FIG. 6 is a schematic structural diagram of a device according to an embodiment of the present invention.

Referring to FIG. 6, FIG. 6 is a device 60 according to an embodiment of the present invention. The device 60 is a reference node (for example, an access point AP or a station STA). The reference node includes a receiving unit 601, a performing unit 602, and a sending unit 603. Detailed descriptions of the units are as follows:

The receiving unit 601 is configured to receive a ranging request frame that is sent by a target node and that is used to instruct to send a first null data packet NDP.

The performing unit 602 is configured to: send the first NDP to the target node and record a first NDP sending time of sending the first NDP, and receive a second NDP sent by the target node and record a second NDP receiving time of receiving the second NDP.

The sending unit 603 is configured to send, to the target node, a ranging response frame including the first NDP sending time and the second NDP receiving time, so that the target node calculates a distance between the target node and the reference node based on a first NDP receiving time of receiving the first NDP, a second NDP sending time of sending the second NDP, the first NDP sending time, and the second NDP receiving time.

According to the foregoing units, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

In an optional solution, the performing unit 602 is specifically configured to perform, at least twice, the step of the sending the first NDP to the target node and recording a first NDP sending time of sending the first NDP, and receiving a second NDP sent by the target node and recording a second NDP receiving time of receiving the second NDP.

The foregoing operations are performed a plurality of times to avoid a calculation error, so that a calculation result is more accurate.

In another optional solution, the sending unit 603 is specifically configured to: each time receiving the second NDP sent by the target node and recording the second NDP receiving time of receiving the second NDP, send, to the target node, the ranging response frame including the first NDP sending time and the second NDP receiving time.

In other words, each time receiving the second NDP, the reference node sends the ranging response frame to the target node. For example, if the reference node successively receives M (M is a natural number greater than 1) second NDPs sent by the reference node, the reference node sends, to the target node M times, the ranging response frame (the ranging response frame includes a first NDP sending time of last sending the first NDP and a second NDP receiving time of last receiving the second NDP), instead of sending, to the target node once by using one ranging response frame, all first NDP sending time of sending the first NDP and all second NDP receiving time of receiving the second NDP, so as to reduce a risk of sending the first NDP sending time and the second NDP receiving time.

In another optional solution, a physical layer frame header or a Media Access Control layer frame header of the ranging request frame includes information used to indicate a quantity of times that the reference node performs the step of the sending the first NDP to the target node and recording a first NDP sending time of sending the first NDP, and receiving a second NDP sent by the target node and recording a second NDP receiving time of receiving the second NDP.

Specifically, the physical layer frame header or the Media Access Control layer frame header of the ranging request frame indicates the quantity of times of performing the foregoing step, so that the reference node can quickly obtain the information about the quantity of times and perform a corresponding step based on the information about the quantity of times.

In another optional solution, the physical layer frame header or the Media Access Control layer frame header of the ranging request frame includes information used to instruct the reference node to send the first NDP.

Specifically, the physical layer frame header or the Media Access Control layer frame header of the ranging request frame is used to instruct the reference node to send the first NDP, so that the reference node can send the first NDP based on the instruction in a timely manner.

It should be noted that, for specific implementation of the device 60 shown in FIG. 6, refer to the corresponding description in the method embodiment in FIG. 2, and details are not described herein again.

The method and the apparatuses in the embodiments of the present invention are described in detail above. For ease of better implementing the foregoing solutions in the embodiments of the present invention, a related system in an embodiment of the present invention is described below with reference to FIG. 7.

Figure 7:
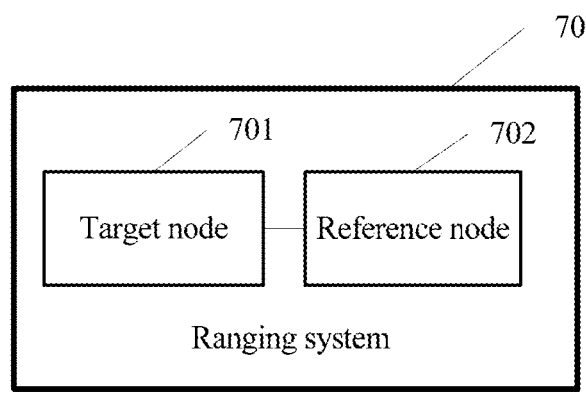
FIG. 7 is a schematic structural diagram of a Wireless Fidelity Wi-Fi ranging system according to an embodiment of the present invention.

Referring to FIG. 7, FIG. 7 is a Wireless Fidelity Wi-Fi ranging system 70 according to an embodiment of the present invention. The ranging system 70 includes a target node 701 and a reference node 702. The target node 701 is the device 30 in the embodiment shown in FIG. 3 or the device 50 in the embodiment shown in FIG. 5. The reference node 702 is the device 40 in the embodiment shown in FIG. 4 or the device 60 in the embodiment shown in FIG. 6.

In conclusion, according to the embodiments of the present invention, after receiving the ranging request frame sent by the target node, the reference node does not send an ACK to the target node, but directly sends the first NDP to the target node. The target node sends the second NDP to the reference node after receiving the first NDP, and the reference node sends the ranging response frame to the target node after receiving the second NDP. After receiving the ranging response frame, the target node does not send an ACK to the reference node, but directly calculates the distance between the target node and the reference node based on time information in an interaction process, so that ranging efficiency is improved because in the ranging process, there is a relatively small quantity of times of information interactions and a relatively short time is required for the information interactions.

What is claimed is:

1. A Wireless Fidelity (Wi-Fi) ranging method, comprising:
   sending, by a target node, a ranging request frame to a reference node, wherein the ranging request frame comprises indication information used to instruct the reference node to send a first null data packet (NDP), wherein the first NDP does not comprise data, wherein a physical layer frame header or a Media Access Control layer frame header of the ranging request frame comprises information indicating a number greater than one corresponding to a number of times that the following steps are to be cyclically performed by the reference node:
      sending the first NDP to the target node and recording a first NDP sending time of sending the first NDP; and
      receiving a second NDP sent by the target node and recording a second NDP receiving time of receiving the second NDP;
   cyclically performing the following steps the indicated number of times:
      receiving, by the target node, the first NDP sent by the reference node and recording a first NDP receiving time of receiving the first NDP; and
      in response to receiving the first NDP sent by the reference node, sending, by the target node, the second NDP to the reference node and recording a second NDP sending time of sending the second NDP;
   receiving, by the target node and in response to each of the sending the second NDP to the reference node and recording the second NDP sending time of sending the second NDP, a ranging response frame sent by the reference node, wherein the ranging response frame comprises a first NDP sending time at which the reference node sends the first NDP and a second NDP receiving time at which the reference node receives the second NDP; and
   calculating, by the target node, a distance between the target node and the reference node based on the first NDP receiving time, the second NDP sending time, the first NDP sending time, and the second NDP receiving time.

2. The method according to claim 1, wherein the calculating, by the target node, a distance between the target node and the reference node based on the first NDP receiving time, the second NDP sending time, the first NDP sending time, and the second NDP receiving time comprises:
   when there are a plurality of first NDP receiving times, a plurality of second NDP sending times, a plurality of first NDP sending times, and a plurality of second NDP receiving times, calculating an average value of the first NDP receiving times, an average value of the second NDP sending times, an average value of the first NDP sending times, and an average value of the second NDP receiving times; and
   calculating the distance between the target node and the reference node based on the average value of the first NDP receiving time, the average value of the second NDP sending time, the average value of the first NDP sending time, and the average value of the second NDP receiving time.

3. The method according to claim 1, wherein a physical layer frame header or a Media Access Control layer frame header of the ranging request frame comprises information used to instruct the reference node to send the first NDP.

4. A Wireless Fidelity (Wi-Fi) ranging method, comprising:
   receiving, by a reference node, a ranging request frame sent by a target node and used to instruct the reference node to send a first null data packet (NDP), wherein the first NDP does not comprise data, wherein a physical layer frame header or a Media Access Control layer frame header of the ranging request frame comprises information indicating a number greater than one corresponding to a number of times that the following steps are to be cyclically performed by the reference node:
      sending the first NDP to the target node and recording a first NDP sending time of sending the first NDP; and
      receiving a second NDP sent by the target node and recording a second NDP receiving time of receiving the second NDP;
   cyclically performing the following steps the indicated number of times:
      sending, by the reference node, the first NDP to the target node and recording the first NDP sending time of sending the first NDP; and
      after sending the first NDP to the target node, receiving, by the reference node, the second NDP sent by the target node and recording the second NDP receiving time of receiving the second NDP; and
   sending, by the reference node to the target node and in response to each of the receiving the second NDP sent by the target node and recording the second NDP receiving time of receiving the second NDP, a ranging response frame comprising the first NDP sending time and the second NDP receiving time, wherein the target node calculates a distance between the target node and the reference node based on a first NDP receiving time of receiving the first NDP, a second NDP sending time of sending the second NDP, the first NDP sending time, and the second NDP receiving time.

5. The method according to claim 4, wherein a physical layer frame header or a Media Access Control layer frame header of the ranging request frame comprises information used to instruct the reference node to send the first NDP.

6. A device, wherein the device is a target node, the target node comprises an input apparatus, an output apparatus, a memory, and at least one processor, and the at least one processor invokes a ranging program in the memory to perform the following operations:
   sending a ranging request frame to a reference node by the output apparatus, to instruct the reference node to send a first null data packet (NDP), wherein the NDP does not comprise data, wherein a physical layer frame header or a Media Access Control layer frame header of the ranging request frame comprises information indicating a number greater than one corresponding to a number of times that the following steps are to be cyclically performed by the reference node:
      sending the first NDP to the target node and recording a first NDP sending time of sending the first NDP; and
      receiving a second NDP sent by the target node and recording a second NDP receiving time of receiving the second NDP;

cyclically performing the following steps the indicated number of times:
  receiving, by the input apparatus, the first NDP sent by the reference node and recording a first NDP receiving time of receiving the first NDP; and
  in response to receiving the first NDP sent by the reference node, sending, by the output apparatus, the second NDP to the reference node by the output apparatus and recording a second NDP sending time of sending the second NDP;
receiving, by the input apparatus and in response to each of the sending the second NDP to the reference node and recording the second NDP sending time of sending the second NDP, a ranging response frame sent by the reference node, wherein the ranging response frame comprises a first NDP sending time at which the reference node sends the first NDP and a second NDP receiving time at which the reference node receives the second NDP; and
calculating a distance between the target node and the reference node based on the first NDP receiving time, the second NDP sending time, the first NDP sending time, and the second NDP receiving time.

7. The device according to claim 6, wherein that the at least one processor calculates a distance between the target node and the reference node based on the first NDP receiving time, the second NDP sending time, the first NDP sending time, and the second NDP receiving time comprises:
  when there are a plurality of first NDP receiving times, a plurality of second NDP sending times, a plurality of first NDP sending times, and a plurality of second NDP receiving times, calculating an average value of the first NDP receiving time, an average value of the second NDP sending time, an average value of the first NDP sending time, and an average value of the second NDP receiving time; and
  calculating the distance between the target node and the reference node based on the average value of the first NDP receiving time, the average value of the second NDP sending time, the average value of the first NDP sending time, and the average value of the second NDP receiving time.

8. The device according to claim 6, wherein a physical layer frame header or a Media Access Control layer frame header of the ranging request frame comprises information used to instruct the reference node to send the first NDP.

* * * * *